United States Patent [19]

Furukawa et al.

[11] Patent Number: 5,166,793
[45] Date of Patent: Nov. 24, 1992

[54] VIDEO CAMERA SYNCHRONIZING CIRCUIT

[75] Inventors: Norimasa Furukawa, Tokyo; Shiro Morotomi, Kanagawa, both of Japan

[73] Assignee: Sony Corporation, Tokyo, Japan

[21] Appl. No.: 684,172

[22] Filed: Apr. 11, 1991

[30] Foreign Application Priority Data

Apr. 25, 1990 [JP] Japan .................. 2-109552
Apr. 25, 1990 [JP] Japan .................. 2-109553

[51] Int. Cl.⁵ .................................. H04N 5/04
[52] U.S. Cl. ........................... 358/158; 358/148
[58] Field of Search .......... 358/190, 148, 158, 149, 358/181, 108

[56] References Cited

U.S. PATENT DOCUMENTS

| 4,561,021 | 12/1985 | Abe | 358/158 |
| 4,763,193 | 8/1988 | DeVilbiss | 358/149 |
| 4,766,491 | 8/1988 | Saitoh et al. | 358/181 X |
| 4,860,101 | 8/1989 | Pshtissky et al. | 358/149 |
| 4,897,723 | 1/1990 | Arai | 358/158 |
| 5,001,564 | 3/1991 | Randall | 358/149 |

Primary Examiner—Victor R. Kostak
Attorney, Agent, or Firm—Ronald P. Kananen

[57] ABSTRACT

A signal processing circuit for a video camera includes: a voltage controlled oscillator for controlling an oscillation frequency in accordance with a control signal, a synchronism generation circuit for generating a synchronizing pulse signal in accordance with an output signal of the voltage controlled oscillator, and a phase comparison circuit for comparing the phase of the synchronizing pulse signal being output from the synchronism generation circuit with a signal corresponding to the phase of an AC utility power source. The voltage controlled oscillator is controlled by the output signal of the phase comparison circuit, and in turn controls the synchronism in accordance with the phase of the AC utility power.

21 Claims, 6 Drawing Sheets

Fig. 4E $V_{PLS}$
Fig. 4F $S_R$
Fig. 4G $S_H$

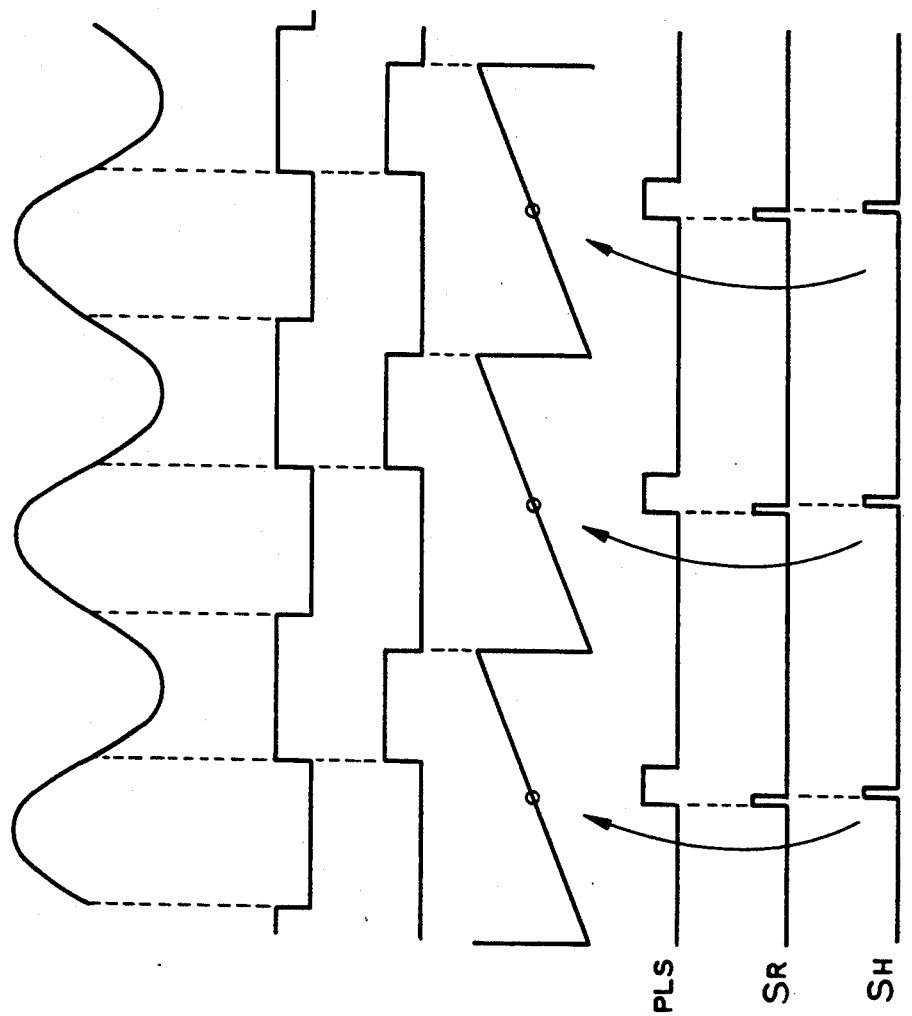

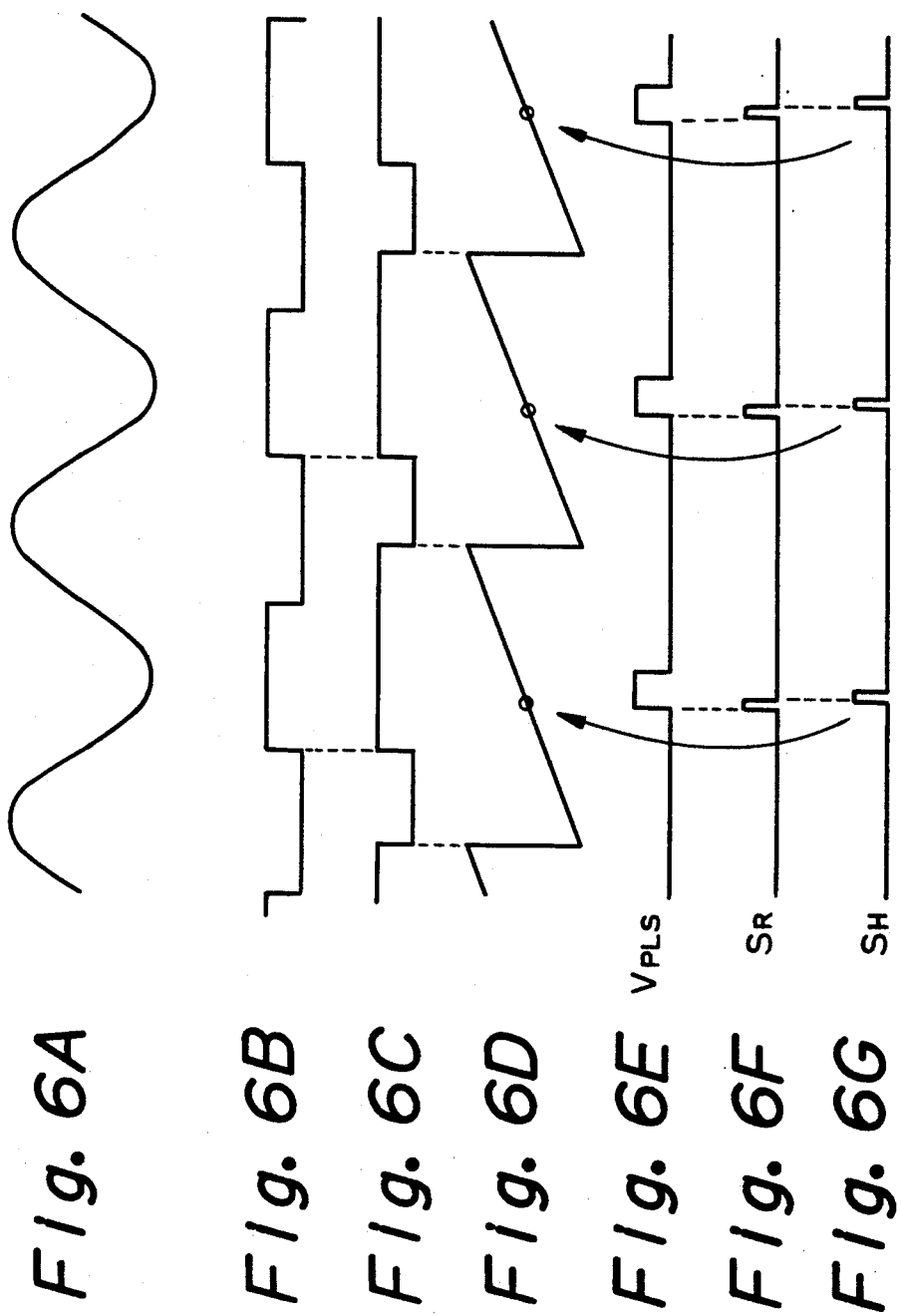

VIDEO CAMERA SYNCHRONIZING CIRCUIT

BACKGROUND OF THE INVENTION

1. Field of the Invention

The present invention relates to a signal processing circuit of a video camera for synchronously operating a plurality of video cameras suitable for building a security system.

2. Description of the Prior Art

A security system with video cameras installed in rooms for monitoring their interiors from a remote location has been widely used. To build such a security system, it is necessary to synchronously operate the video cameras to prevent loss of synchronism when switching from video camera to another.

To synchronously operate the video cameras, it is necessary to supply a common synchronizing signal from a controller to each of the video cameras. However, in the countries where the frequency of the AC utility power accords with the field frequency of the television system, for example, the United States, by using the AC utility power, the video cameras can be synchronously operated without the synchronous signal supplied from the controller thereto. The method of synchronously operating the video cameras with the AC utility power is called AC lock.

FIGS. 1 and 2 show an example of conventional video camera systems which synchronously operate a plurality of video cameras by using the AC utility power. In the example, the frequency of the AC utility power is 60 Hz and a television system with a field frequency of 60 Hz is used.

FIG. 1 shows an example of an image pick-up tube. In the figure, reference numeral 51 is a synchronism generation counter for generating a vertical pulse signal $V_{PLS}$ and a horizontal pulse signal $H_{PLS}$. The synchronism generation counter 51 counts the number of pulses of a reference clock signal CK (for, example, of frequency 4 $f_{sc}$ of where $f_{sc}=14.3$ MHz) so as to form the horizontal pulse signal $H_{PLS}$ and the vertical pulse signal $V_{PLS}$. A vertical reset signal is supplied from a wave form shaping circuit 53 to the synchronism generation counter 51.

The horizontal pulse signal $H_{PLS}$ and the vertical pulse signal $V_{PLS}$ are supplied from the synchronism generation counter 51 to a deflection circuit 52. The deflection circuit 52 forms sawtooth waves for horizontal deflection and vertical deflection in accordance with the horizontal pulse signal $H_{PLS}$ and the vertical pulse signal $V_{PLS}$ supplied from the synchronism generation counter 51. The output signal of the deflection circuit 52 is supplied to an image pick-up tube 54. The image pick-up tube 54 scans an electron beam in accordance with the output signal of the deflection circuit 52.

The image pick-up tube 54 images an object. The output signal of the image pick-up tube 54 is supplied to a video signal processing circuit 55. The video signal processing circuit 55 adds a composite synchronizing signal from the synchronism generation counter 51 to the output signal of the image pick-up tube 54, thereby forming a video signal for the television system having a field frequency of 60 Hz. The video signal is obtained from an output terminal 56.

A source of AC utility power 57 at a frequency of 60 Hz is supplied to the waveform shaping circuit 53. The waveform shaping circuit 53 forms a pulse signal at a frequency of 60 Hz in accordance with the phase of the AC utility power source 57. The 60 Hz pulse signal is supplied to a vertical reset terminal of the synchronism generation counter 51.

The 60 Hz pulse signal from the waveform shaping circuit 53 causes the synchronism generation counter to be reset. Thus, the vertical phase of the video signal is forcedly synchronized with the phase of the AC utility power 57.

FIG. 2 shows an example of using a solid state imaging device. In the figure, a synchronism generation counter 61 counts the number of pulses of a reference clock signal CK so as to generate a field distinction signal $S_F$ as well as the horizontal pulse signal $H_{PLS}$ and the vertical pulse signal $V_{PLS}$. The horizontal pulse signal $H_{PLS}$, the vertical pulse signal $V_{PLS}$, and the field distinction signal $S_F$ are supplied to a clock driver 62. The clock driver 62 generates a horizontal transfer clock signal and a vertical transfer clock signal in accordance with the horizontal pulse signal $H_{PLS}$ and the vertical pulse signal $V_{PLS}$, respectively. The horizontal transfer clock and the vertical transfer clock are supplied to a solid state imaging device 64 which is a CCD imaging device or the like.

The solid state imaging device 64 images an object. The output signal of the solid state imaging device 64 is supplied to a video signal processing circuit 65. The video signal processing circuit 65 adds a composite synchronizing signal from the synchronism generation counter 61 to the output signal of the solid state imaging device 64, thereby forming a video signal for a television system having a field frequency of 60 Hz. The video signal is obtained from an output terminal 66.

The waveform shaping circuit 63 shapes the wave form of an AC utility power source 67 and forms a 60 Hz pulse signal. The 60 Hz pulse signal is supplied to the synchronism generation counter 61 as a reset signal.

The synchronism generation counter 61 receives the reset signal from the waveform shaping circuit 63. Thus, the synchronism generation counter 61 is forcedly reset in accordance with the 60 Hz AC utility power. Thus, the vertical phase of the video signal is forcedly synchronized with the phase of the AC utility power.

In the video signal processing circuits shown in FIG. 1 and FIG. 2, the synchronism generation counters 51 and 61 are forcedly reset by the output signals of the waveform shaping circuits 53 and 63 for shaping the waveforms of the AC utility power sources 57 and 67, respectively. Thus, the vertical phase is synchronized with the phase of the AC utility power.

However, the frequency and the amplitude of the AC utility power are not strictly controlled and thereby distortions of phase and amplitude take place.

In the conventional video processing circuits shown in FIGS. 1 and 2, when the AC utility power sources 57 and 67 have a time base fluctuation, the number of horizontal scanning lines varies in each field and thereby a vertical jitter occasionally takes place.

In the example of the imagine pick-up tube 54 shown in FIG. 1, when the AC utility power source 57 has a time base fluctuation, the number of scanning lines of an even field of a frame can become the same as that of the odd field, and thereby interlaced scanning cannot be achieved. Thus, the imaging resolution degrades and the video signal cannot be recorded to a VTR.

In the example of using the solid state imaging device 64 shown in FIG. 2, when the AC utility power source 67 has a time base fluctuation, thereby causing the number of scanning lines of an even field becomes the same as that of an odd field, the vertical shift register cannot be switched between the even field and the odd field. Thus, the solid state imaging device 64 does not operate. To prevent that, it is necessary to structure the clock driver 62 with a PLL (Phase-Locked Loop) system. However, such a PLL system should be a high speed device. Thus, when the clock driver 62 is embodied with a PLL structure, its cost increases markedly.

In addition, in the United States, a single-phase, 24 V AC utility power source is supplied for a security system. However, the selection of which phase is to be used for the single-phase, 24 V AC utility power is not always controlled due to the purpose of the application. Thus, when the three-phase AC power is converted into the single phase AC power, the obtained phase of the utility power may differ at different outlet of the same housing different phases.

When the AC-lock is performed with utility power sources whose phases differ from each other, the vertical phase of the video signal differs in each camera. Thus, when one camera is switched to another one, loss of synchronism takes place.

OBJECTS AND SUMMARY OF THE INVENTION

It is, therefore, an object of the present invention to provide a signal processing circuit of a video camera which is stable for the AC lock operation even if the AC utility power has distortions of phase and amplitude and is noisy.

Another object of the present invention is to provide a signal processing circuit for a video camera for securely achieving synchronous control independently of which phase of a three-phase utility power source is selected as a power source.

According to an aspect of the present invention, there is provided a signal processing circuit for a video camera. It comprises a voltage controlled oscillator for controlling an oscillation frequency in accordance with a control signal, a synchronism generation circuit for generating a synchronizing pulse signal in accordance with an output signal of the voltage controlled oscillator, and a phase comparison circuit for comparing the phase of the synchronizing pulse signal being output from the synchronism generation circuit with the phase of a signal generated in accordance with the AC utility power, whereby the voltage controlled oscillator is controlled by the output signal of the phase comparison circuit to be synchronized with the phase of the AC utility power.

When the video cameras are synchronously operated with the AC utility power by use of the phase control loop, the distortions of phase and amplitude of the AC utility power are absorbed and thereby the horizontal pulse signal and the vertical pulse signal from the synchronism generation circuit become stable.

According to another aspect of the present invention, there is provided a further signal processing circuit for a video camera. It comprises a voltage controlled oscillator for controlling an oscillation frequency in accordance with a control signal, a synchronism generation circuit for generating a synchronizing pulse signal in accordance with an output signal of the voltage controlled oscillator, a shift circuit for shifting the phase of a signal generated in accordance with the utility power so as to allow the same timing independently of which one of the three phases of the AC utility power is employed for the power source, the three-phase AC utility power being and a phase comparison circuit for comparing the phase of a synchronizing pulse signal which is output from the synchronism generation circuit with the phase of a signal generated in accordance with the AC utility power and the setting of the shift circuit. The signal process circuit controls the voltage controlled oscillator by using the output signal of the phase comparison circuit, thereby synchronizing the output video signal accordance with the phase of the AC utility power.

As was described above, since the phase of a signal formed in accordance with the utility power is properly shifted, when the input AC utility power is formed by converting three-phase AC power into single phase AC power, even if the phase connections are different in each of different cameras, they can all be correctly operated.

The above and other objects, features and advantages of the present invention will become readily apparent from the following detailed description thereof which is to be read in connection with the accompanying drawings.

BRIEF DESCRIPTION OF THE DRAWINGS

FIGS. 4A to 6G are schematic diagrams of waveforms for describing the embodiment of the present invention.

DETAILED DESCRIPTION OF THE PREFERRED EMBODIMENT

With reference to the accompanying drawings, an embodiment of the present invention will be described.

Figure 1:
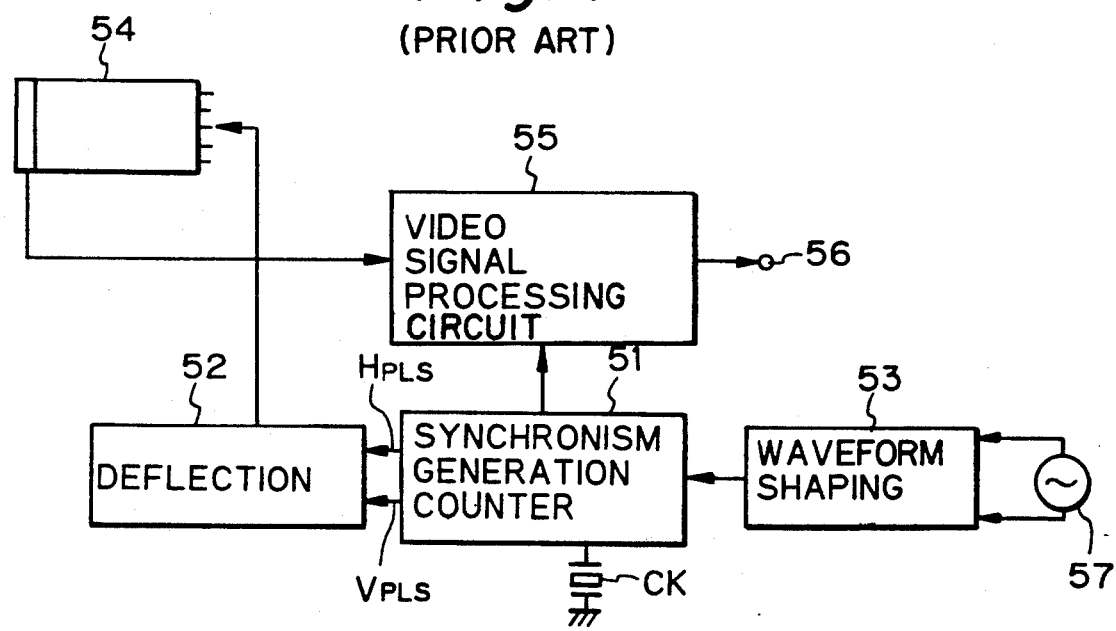
FIG. 1 is a block diagram showing an example of a conventional video camera.
Figure 2:
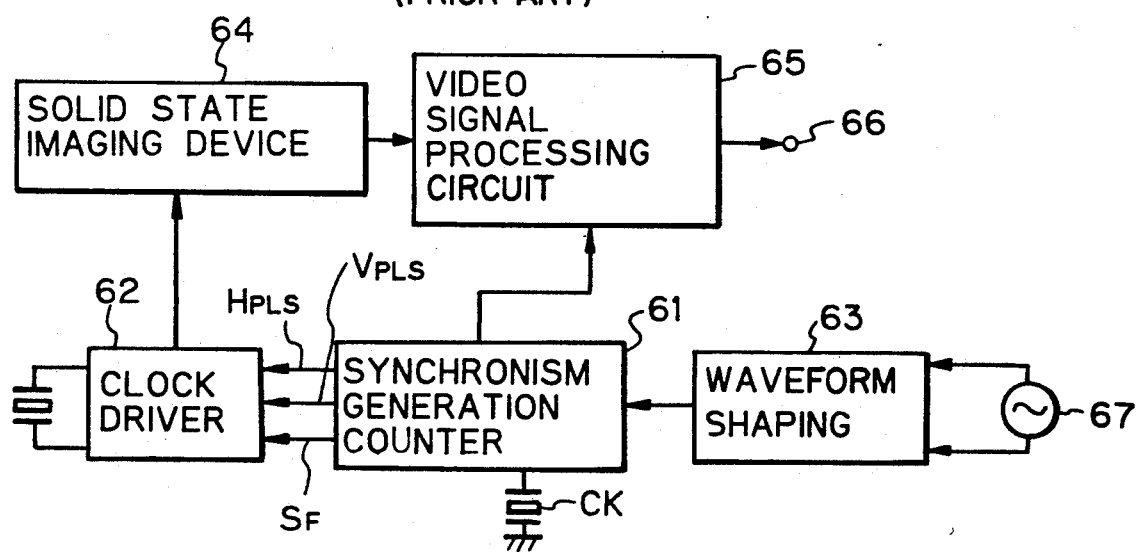
FIG. 2 is a block diagram showing another example of conventional video camera.
Figure 3:
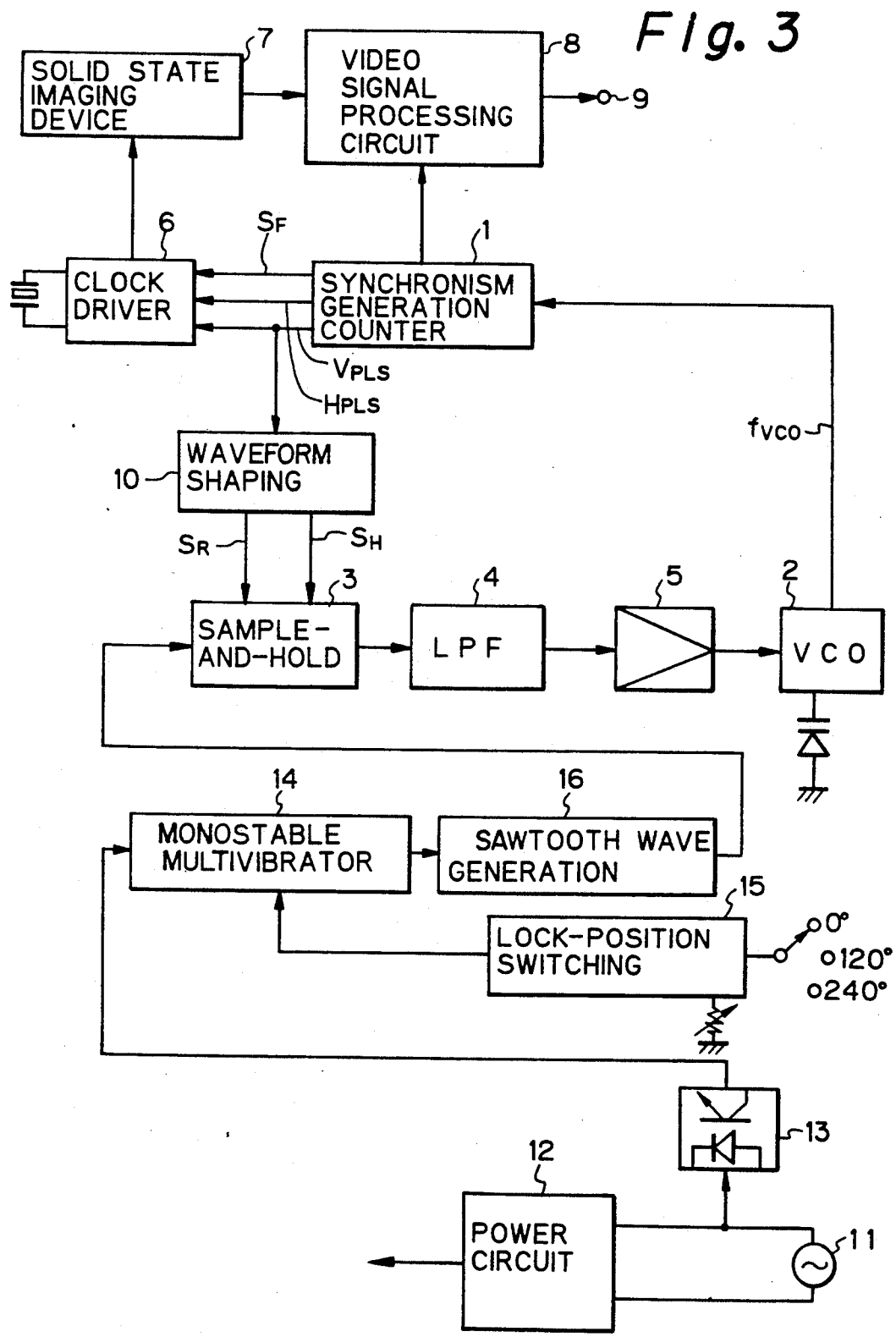
FIG. 3 is a block diagram showing an embodiment according to the present invention.

FIG. 3 is an embodiment of the present invention. In FIG. 3, reference numeral 1 is a synchronism generation counter. A reference signal $f_{VCO}$ (for example, 4 $f_{SC}$) is supplied from a VCO (voltage controlled oscillator) 2 to the synchronism generation counter 1. A comparison output resulting from a comparison between a phase corresponding to signal compared between the phase an AC utility power source 11 and the phase of a vertical pulse signal $V_{PLS}$ is output from a sample-and-hold circuit 3 to the VCO 2 through a low pass filter 4 and an amplifier 5. The oscillation frequency of the VCO 2 is controlled in accordance with the phase comparison output signal. The VCO 2 is of the Colpitts type, in which a control voltage is applied to a variable capacity diode so as to vary the oscillation frequency. An amplifier 5 is used to increase the control gain. The amplifier 5 is of a CMOS type.

The synchronism generation counter 1 generates a horizontal pulse signal $H_{PLS}$ and the vertical pulse signal $V_{PLS}$ by counting the number of pulses of the reference signal $f_{VCO}$ from the VCO 2. It also generates a field distinction signal $S_F$. The horizontal pulse signal $H_{PLS}$ and the vertical pulse signal $V_{PLS}$ are supplied to a clock driver 6.

The clock driver 6 generates a horizontal transfer clock signal and a vertical transfer clock signal in accordance with the output from the synchronism generation counter 1.

The horizontal transfer clock signal and the vertical transfer clock signal from the clock driver 6 are supplied to a solid state imaging device 7 which is a CCD imaging device or the like. The solid state imaging device 7 is driven with the horizontal transfer clock signal and the vertical transfer clock signal.

The solid state imaging device 7 images an object. The output signal of the solid state imaging device 7 is supplied to a video signal processing circuit 8. The video signal processing circuit 8 adds a composite synchronizing signal from the synchronism generation circuit 1 to the output signal of the solid state imaging device 7. Thus, a video signal at a field frequency of 60 Hz in the television system is formed. The video signal is obtained from an output terminal 9.

The vertical pulse signal $V_{PLS}$ is supplied from the synchronism generation counter 1 to a waveform shaping circuit 10. The waveform shaping circuit 10 forms a reset pulse signal $S_R$ and a sample-and-hold pulse signal $S_H$. The reset pulse signal $S_R$ and the sample-and-hold pulse signal $S_H$ are supplied from the wave form shaping circuit 10 to the sample-and-hold circuit 3.

A single-phase 60 Hz AC utility power source 11 is applied to a power circuit 12 and to a monostable multivibrator 14 through a photocoupler 13. The power circuit 12 generates power for each portion of the television system.

The time constant of the monostable multivibrator 14 can be set three ways, with the delay amount at increments of 120 degrees, by a lock-switch circuit 15. In addition, the time constant of the monostable multivibrator 14 can be precisely adjusted.

The monostable multivibrator 14 generates a pulse signal in accordance with the phase of the 60 Hz AC utility power but with a particular delay amount. The output of the monostable multivibrator 14 is supplied to a saw tooth wave generation circuit 16.

The saw tooth wave generation circuit 16 generates a saw tooth wave signal in synchronization with the output signal of the monostable multivibrator 14. The sawtooth wave signal is supplied to the sample and hold circuit 3.

After the sample-and-hold circuit 3 is reset with the reset pulse signal $S_R$, which is generated by shaping the waveform of the vertical synchronizing pulse signal $V_{PLS}$, it samples the sampled value of the sawtooth wave signal supplied from the sawtooth wave generation circuit 16 and holds the sampled value. Thus, the phase is obtained from the comparison output signal compared between the phase of the vertical pulse signal $V_{PLS}$ from the synchronous generation counter 1 and the phase of the AC utility power through the monostable multivibrator 14.

The output signal of the sample-and-hold circuit 3 is supplied to the VCO 2 through the low pass filter 4 and the amplifier 5. The oscillation frequency of the VCO 2 is controlled with the output signal of the sample-and-hold circuit 3 through the low pass filter 4 and the amplifier 5.

As was described above, in the embodiment according to the present invention, the sample-and-hold circuit 3 compares the phase of the vertical synchronizing pulse signal $V_{PLS}$ from the synchronism generation counter 1 with the phase of the AC utility power source 11, the phase thereof being delayed for a particular amount by the monostable multivibrator 14. The comparison output signal controls the VCO 2. With the output signal $f_{VCO}$ of the VCO 2, the synchronism generation counter 1 generates the horizontal pulse signal $H_{PLS}$ and the vertical pulse signal $V_{PLS}$. Thus, a phase control loop is structured.

Figures 4A, 4B, 4C, 4D:
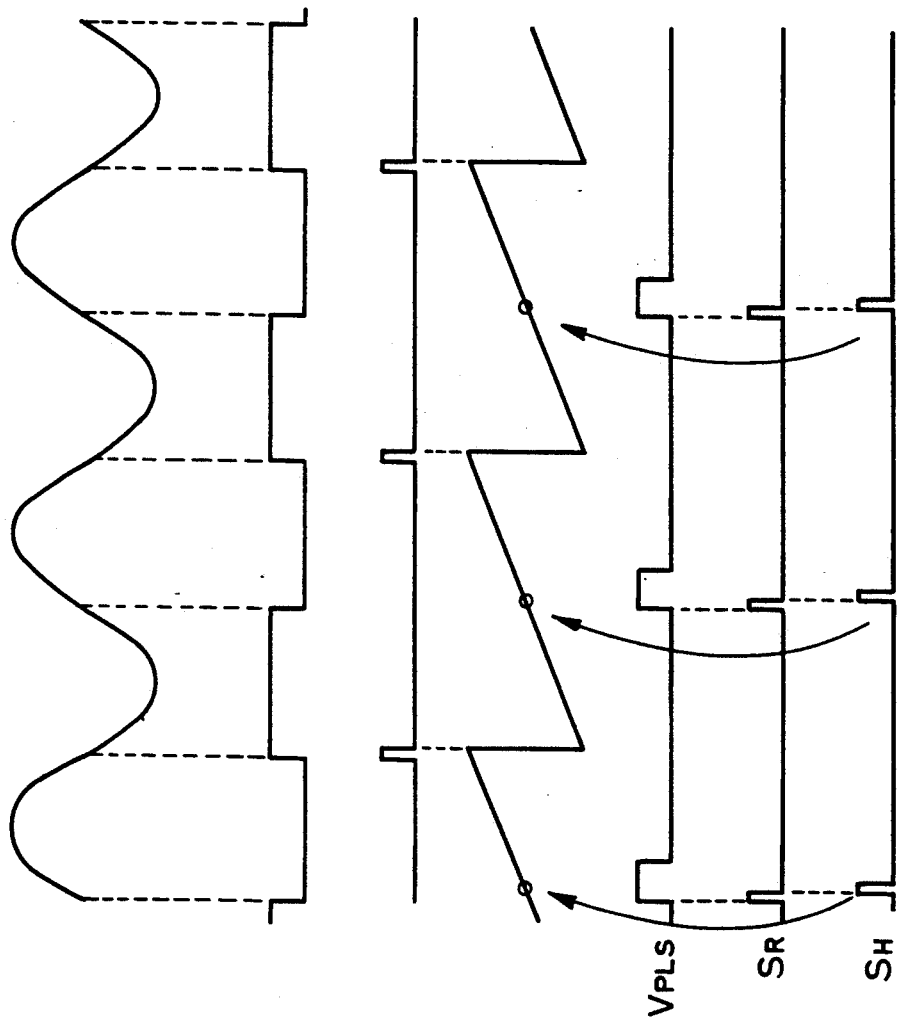

In other words, when the waveform of the single-phase AC utility power source 11 as shown in FIG. 4A is applied, the photocoupler 13 outputs a waveform shaped pulse signal in accordance therewith and having a waveform as shown in FIG. 4B. The output signal of the photocoupler 13 is supplied to the monostable multivibrator 14. When the output signal of the photocoupler 13 rises, the monostable multivibrator 14 is triggered. Thus, a pulse signal as shown in FIG. 4C is output from the monostable multivibrator 14. When the output signal of the monostable multivibrator 14 falls as shown in FIG. 4D, the sawtooth wave generation circuit 16 synchronously generates a sawtooth wave signal.

On the other hand, the synchronism generation counter 1 outputs the the vertical pulse signal $V_{PLS}$ as shown in FIG. 4E. When the vertical pulse signal $V_{PLS}$ rises, the waveform shaping circuit 10 outputs the reset pulse signal $S_R$ as shown in FIG. 4F. When the reset pulse signal $S_R$ falls, the waveform shaping circuit 10 outputs the sample and hold pulse signal $S_H$ as shown in FIG. 4G.

The sample and hold circuit 3 samples and holds the sawtooth wave signal as shown in FIG. 4D by using the sample-and-hold pulse signal $S_H$ (FIG. 4G). The output signal of the sample-and-hold 3 circuit becomes a phase error signal. The phase error signal is supplied to the VCO 2 through the low pass filter 4 and the amplifier 5.

The phase control loop causes the vertical pulse signal $V_{PLS}$, which is output from the synchronism generation counter 1, to synchronize with the AC utility power source 11, whose phase is delayed for a particular amount by the monostable multivibrator 14. In addition, even if distortions of phase and amplitude take place in the AC utility power source 11, they are absorbed by the phase control loop. Thus, the horizontal pulse signal $H_{PLS}$ and the vertical synchronizing pulse signal $V_{PLS}$, which are generated by the synchronism generation counter 1, are free from the distortions of phase and amplitude.

The above mentioned phase control loop allows the horizontal pulse signal $H_{PLS}$ and the vertical pulse signal $V_{PLS}$, which are generated by the synchronism generation counter, to become stable. Thus, it is not necessary to for the clock driver 6 to be of the PLL type thereby reducing cost.

Moreover, the phase control loop does its comparing with the phase of the 60 Hz AC utility power source 11 based on the reference signal $f_{VCO}$ which has a frequency of 4 $f_{SC}$ (14.32 MHz) and, whereby the frequency dividing ratio N is very large. Thus, even if the reference signal fluctuates on the order of several 10 kHz, the phase control loop is still locked. However, since the frequency dividing ratio N is very large, the jitter on the real screen can be mostly ignored.

In this example, the amplifier 5 is provided so that the dynamic range of the VCO 2 at the low voltage (for example 5 V) can be widened.

In addition, when the utility power is absent, all the operations are stopped. Thus, theoretically a free run state does not take place. Therefore, a saw tooth wave signal is generated with a signal in accordance with the AC utility power. Thereafter, the sawtooth wave signal is sampled to obtain the phase error. If the free run state could occur, it would be necessary to use a trapezoidal wave signal, whereby the structure would become complicated and a wide dynamic range cannot be obtained. In addition, since the sawtooth wave signal is sampled so as to obtain the phase error, it is not necessary to use a high speed device. Moreover, since an error signal successively takes place, the low pass filter 4 can be simply structured.

As was described above, in the embodiment according to the present invention, the time constant of the monostable multivibrator 14 can be switched to three levels.

FIG. 5 is a schematic diagram showing that a delay amount of the monostable multivibrator 14 is increased to 120 degrees of a phase cycle of the single-phase AC utility power source.

FIGS. 6A to 6G show the waveforms for the case that the delay amount of the monostable multivibrator 14 is increased to 240 degrees.

As shown in FIGS. 4A to 6G when the delay amount of the monostable multivibrator 14 is switched, the relationship of phase between the AC utility power and the vertical pulse signal $V_{PLS}$ can be switched to three levels corresponding to increments of 120 degrees. Thus, when the AC utility power 11 is generated by converting three-phase AC power into single-phase AC power, even if the phase connections differ in any two cameras, they can be correctly operated.

Figure 7:
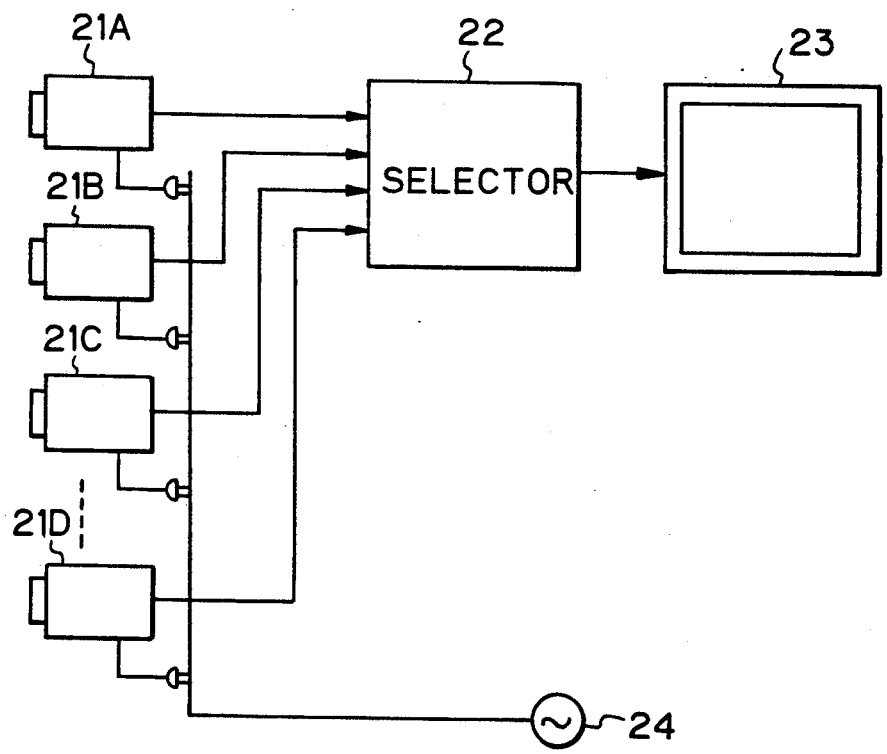
FIG. 7 is a block diagram showing an example of a security system to which the present invention can be applied.

FIG. 7 is a block diagram showing a security system to which the present invention can be applied.

In FIG. 7, reference numerals 21A, 21B, 21C, and 21D are video cameras to which the present invention is applied. These video cameras are installed in different rooms. The output signals of the video cameras 21A to 21D are supplied to a monitor 23 through a selector 22. The selector 22 selects a desired video camera from the video cameras 21A to 21D. An output signal of the selected video camera from the video cameras 21A to 21D is supplied to the monitor 23. The monitor 23 can display all the image of the video cameras 21A to 21D at the same time. By watching screens displayed on the monitor 23, the operator monitors the situation of each room.

In such a security system, unless all the video cameras 21A to 21D are synchronously operated, when one of the video cameras 21A to 21D is switched with the selector 22, loss of synchronism takes place.

An AC utility power source 24 is supplied to the video cameras 21A to 21D. The frequency of the AC utility power 24 is 60 Hz, which is the same as the field frequency of the video cameras 21A to 21D. As was described above, for each of the video cameras 21A to 21D, the operating power of each is supplied from the AC utility power source 24. In addition, the AC utility power source 24, all the video cameras 21A to 21D are in synchronism.

What is claimed is:

1. A circuit for a video camera system, for producing an AC locked video signal, said circuit comprising:
   a voltage controlled oscillator for controlling an oscillation frequency output therefrom in accordance with a control signal input thereto;
   a synchronism generation circuit for generating a synchronizing pulse signal in accordance with said output of said voltage controlled oscillator; and
   a phase comparison circuit for comparing the phase of said synchronizing pulse signal output from said synchronism generation circuit with the phase of a signal generated in accordance with a phase of an AC utility power source and to provide a corresponding output signal;
   wherein said voltage controlled oscillator is controlled by said output signal of said phase comparison circuit, so that said synchronizing pulse signal output from said synchronism generation circuit is at least approximately in synchronism with said one phase of said AC utility power source with a predetermined delay therebetween.

2. A circuit for a video camera, comprising:
   a voltage controlled oscillator for controlling an oscillation frequency output therefrom in accordance with a control signal input thereto;
   a synchronism generation circuit for generating as an output a synchronizing pulse signal in accordance with said output of said voltage controlled oscillator;
   AC phase detection means for generating a signal in accordance with a selected phase of a source of three-phase utility power, including a shift circuit for shifting the phase of said generated signal so as to provide an output from said AC phase detection means with the same timing independently of which one of said three phases of said AC utility power source is selected; and
   a phase comparison circuit for comparing the phase of said synchronizing pulse signal which is output from said synchronism generation circuit with the phase of said generated signal and to provide a corresponding output signal;
   wherein said voltage controlled oscillator is controlled by said output signal of said phase comparison circuit said synchronizing pulse signal output from said synchronism generation counter independently of which one of said three phases of said AC utility power source is selected.

3. A circuit for a video camera as set forth in claim 2, wherein said shift circuit shifts the phase of said generated signal to a respective one of three levels at increments of 120 deg.

4. A circuit for a video camera as set forth in any one of claims 1 to 3, wherein said selected phase of said AC utility power source is detected through a photo coupler to provide a signal corresponding to said generated signal.

5. A circuit for a video camera as set forth in any one of claims 1 to 3, wherein said phase comparison circuit generates a sawtooth wave signal by using said generated signal, samples said sawtooth wave with a sampling pulse generated with said synchronizing pulse, and generates a phase error signal which corresponds to said control signal provided to said voltage controlled oscillator.

6. A circuit for a video camera as set forth in any one of claims 1 to 3, wherein said signal processing circuit supplies said phase error signal to said voltage controlled oscillator through a loop filter and a gain amplifier.

7. A circuit for a video camera as set forth in any one of claims 1 to 3, wherein said voltage controlled oscillator applies said control voltage to a variable capacity diode so as to vary said oscillation frequency.

8. A circuit for a video camera as set forth in claim 4, wherein said phase comparison circuit generates a sawtooth wave signal by using said generated signal, samples said sawtooth wave with a sampling pulse generated with said synchronizing pulse, and generates a phase error signal corresponding to said control signal input to said voltage controlled oscillator.

9. A circuit for a video camera as set forth in claim 5, wherein said phase comparison circuit generates a sawtooth wave signal by using said generated signal, samples said sawtooth wave with a sampling pulse generated with said synchronizing pulse, and generates a phase error signal which corresponds to said control signal input to said voltage controlled oscillator.

10. A circuit for a video camera as set forth in claim 6, wherein said phase comparison circuit generates a sawtooth wave signal by using said generated signal, samples said sawtooth wave with a sampling pulse generated with said synchronizing pulse, and generates a phase error signal which corresponds to said control signal input to said voltage controlled oscillator.

11. A circuit for a video camera as set forth in claim 5, wherein said voltage controlled oscillator applies a control voltage to a variable capacity diode so as to vary an oscillation frequency.

12. A circuit for a video camera as set forth in claim 6, wherein said voltage controlled oscillator applies a control voltage to a variable capacity diode so as to vary an oscillation frequency.

13. A signal processing circuit for a video camera as set forth in claim 7, wherein said voltage controlled oscillator applies a control voltage to a variable capacity diode so as to vary an oscillation frequency.

14. A signal processing circuit for a video camera as set forth in claim 1, wherein said voltage controlled oscillator, synchronism generation circuit and said phase comparison circuit are such that said circuit cannot operate in a free run state, namely when said signal generated in accordance with the phase of said AC utility power source is generated.

15. A remote television camera system for outputting a video signal with a field frequency which is locked with one phase of an AC power source of at least one phase, said system comprising:
  AC phase detecting means for detecting said at least one phase of said AC power source and for outputting an AC phase signal which comprises a waveform which has a beginning portion which is delayed a predetermined amount from said at least one phase of said AC power source and which varies in time after said beginning portion;
  sample-and-hold means which receives as a first input said AC phase signal, samples said waveform of said AC phase signal in accordance with a second input, holds the sampled value, and provides the held sampled value as an output;
  voltage-controlled-oscillator means which receives as an input a signal corresponding to said output from said sample-and-hold means and provides an oscillating output having a frequency that corresponds to said input thereto;
  a synchronism generation counter which receives as an input said output from said voltage-controlled-oscillator and generates as outputs timing signals on a plurality of output lines, including on a first of said output lines a vertical timing signal and on a second of said output lines a composite synchronizing signal;
  waveform shaping means which receives as an input said vertical timing signal from said synchronism generation counter and generates an output which is provided as said second input to said sample-and-hold means;
  imaging means which receive a plurality of said output timing signals on respective ones of said output lines of said synchronism generation counter, and outputs a video signal; and
  video signal processing means which receives as inputs said video signal from said imaging means and said composite synchronizing signal and outputs an AC-locked video signal having a field frequency which is the same as the frequency of said AC power source and which is at least approximately synchronized therewith with a predetermined delay constant therebetween.

16. The system of claim 15, said AC power source having a plurality of said phases, said system further comprising:
  setting means included in said AC phase detection means, said setting means having a number of positions to which it can be set that is equal in number to said plurality of phases of said AC power source, said AC phase detection means being connected to any one of said phases of said AC power source for said detecting of said phase thereof;
  wherein said setting means can be set to a respective one of said positions for each said phase of said AC power source so that said AC phase detecting means outputs said AC phase signal at the same timing independently of which one of said phases of said AC power source it is connected to.

17. The system of claim 15, further comprising:
  a low pass filter having as an input said output of said sample-and-hold means and an output which corresponds to said input to said voltage-controlled-oscillator means;
  wherein fluctuations of phase and amplitude in said phase of said AC power source which is detected by said AC phase detection means are absorbed.

18. The system of claim 16, further comprising:
  a low pass filter having as an input said output of said sample-and-hold means and an output which corresponds to said input to said voltage-controlled-oscillator means;
  wherein fluctuations of phase and amplitude in said phase of said AC power source which is detected by said AC phase detection means are absorbed.

19. A network comprising:
  a plurality of remote television camera systems, each according to the remote television camera system of claim 16, each connected to any one of said plural phases of said AC power source;
  wherein all of said AC-locked video signals are in synchronism with each other as a result of each said setting means being set to a respective one of said setting positions thereof which corresponds to the respective phase of said AC power source to which it is connected.

20. A network comprising:
  a plurality of remote television camera systems, each according to the remote television camera system of claim 17, each connected to any one of said plural phases of said AC power source;
  wherein all of said AC-locked video signals are in synchronism with each other as a result of each said setting means being set to a respective one of said setting positions thereof which corresponds to the respective phase of said AC power source to which it is connected.

21. The system of claim 15, having a high frequency dividing ratio as a result of the frequency of said oscillating output being orders of magnitude greater than that of said vertical timing signal output from said synchronism generation counter.

* * * * *